(12) United States Patent
Hanlon, Jr.

(10) Patent No.: US 11,642,799 B2
(45) Date of Patent: May 9, 2023

(54) PROTECTIVE ROBOT WRAP

(71) Applicant: RJ Hanlon Company, Inc., Westfield, IN (US)

(72) Inventor: Robert Joseph Hanlon, Jr., Noblesville, IN (US)

(73) Assignee: RJ Hanlon Company, Inc., Westfield, IN (US)

( * ) Notice: Subject to any disclaimer, the term of this patent is extended or adjusted under 35 U.S.C. 154(b) by 0 days.

(21) Appl. No.: 17/886,432

(22) Filed: Aug. 11, 2022

(65) Prior Publication Data

US 2022/0379498 A1  Dec. 1, 2022

Related U.S. Application Data

(63) Continuation of application No. 17/374,676, filed on Jul. 13, 2021, now Pat. No. 11,426,886.

(60) Provisional application No. 63/192,895, filed on May 25, 2021.

(51) Int. Cl.
| | | |
|---|---|---|
| *B08B 17/04* | (2006.01) | |
| *B25J 19/00* | (2006.01) | |
| *B25J 15/00* | (2006.01) | |
| *B25J 11/00* | (2006.01) | |

(52) U.S. Cl.
CPC .......... *B25J 19/0075* (2013.01); *B08B 17/04* (2013.01); *B25J 15/0019* (2013.01); *B25J 11/0075* (2013.01)

(58) Field of Classification Search
CPC ........ B25J 18/00; B25J 18/04; B25J 19/0075; B25J 19/0083; B08B 17/04

USPC .................................. 901/14–15, 28, 49
See application file for complete search history.

(56) References Cited

U.S. PATENT DOCUMENTS

| | | | | |
|---|---|---|---|---|
| 4,904,514 A | * | 2/1990 | Morrison | ............ B25J 19/0083 428/80 |
| 6,543,307 B2 | * | 4/2003 | Ambrose | ............ B25J 19/0025 901/49 |
| 7,422,773 B2 | * | 9/2008 | D'Andreta | ............ B05B 5/0533 427/427.2 |
| 8,404,753 B2 | | 3/2013 | Hanlon, Jr. | |
| 8,585,854 B2 | * | 11/2013 | Butterworth, III | ..... B05B 15/50 901/14 |
| 10,105,727 B2 | * | 10/2018 | D'Andreta | ............ B05B 13/02 |
| 10,179,414 B2 | | 1/2019 | Hanlon, Jr. | |
| 10,943,985 B2 | * | 3/2021 | D'Andreta | .......... H01L 29/4966 |
| 2004/0166298 A1 | * | 8/2004 | Chapman | ................ B32B 27/32 428/212 |
| 2009/0248039 A1 | * | 10/2009 | Cooper | .................. A61B 46/10 128/849 |

(Continued)

FOREIGN PATENT DOCUMENTS

| | | | | |
|---|---|---|---|---|
| FR | 2894807 A1 | * | 6/2007 | ............. A61B 17/00 |
| KR | 101783868 B1 | * | 9/2017 | |
| WO | WO-2013159932 A1 | * | 10/2013 | ............. A61B 34/30 |

*Primary Examiner* — Randell J Krug
(74) *Attorney, Agent, or Firm* — McDonnell Boehnen Hulbert & Berghoff LLP

(57) ABSTRACT

The present disclosure relates generally to protective covers, for example, suitable for protecting parts of a robot. The present disclosure relates more particularly to a protective wrap for a robot component. The protective wrap includes a continuous strip of a material sheet configured to wrap around the robot component in a plurality of loops so as to form a tubular body that surrounds a portion of the robot component.

20 Claims, 9 Drawing Sheets

(56) References Cited

U.S. PATENT DOCUMENTS

2010/0268249 A1* 10/2010 Stuart .................... A61B 46/10
606/130
2011/0277775 A1* 11/2011 Holop .................... A61B 46/10
128/849
2019/0321989 A1* 10/2019 Anderson ............... B08B 9/023
2020/0290218 A1*  9/2020 Hannig .................. B05B 12/24
2021/0323176 A1* 10/2021 Riedel .................. B25J 19/0075

* cited by examiner

PROTECTIVE ROBOT WRAP

CROSS REFERENCE TO RELATED APPLICATIONS

This application is a continuation of U.S. application Ser. No. 17/374,676, filed Jul. 13, 2021, which claims the benefit of priority to U.S. Provisional Patent Application No. 63/192,895, filed May 25, 2021, each of which is hereby incorporated herein by reference in its entirety.

BACKGROUND

Robots are frequently operated in harsh environments and the surface of the robot can become contaminated and unclean. Cleaning the robots can be labor intensive and use of the robot is typically suspended during the cleaning process.

OVERVIEW

Disclosed herein are materials, systems and methods for protecting the surface of machine components. Beneficially, various embodiments of the materials, systems and methods can be used to protect parts of the machine and keep the machine components relatively clean so that time consuming and labor intensive cleaning steps can be reduced. The protective wrap may also beneficially retain contaminants to prevent further contamination, for example, by dripping of contaminants onto other surfaces.

The protective wrap and methods described herein are adapted for protecting a variety of different machine components, including robotic equipment, manufacturing equipment, industrial equipment, automated equipment, and other machinery from contaminating substances in a variety of industries, including medical, food processing, aerospace, watercraft, heavy industrial, automotive, and others.

The embodiments described in further detail herein relate to robotic equipment and the use of the protective wrap for protecting robot components, such as arm segments, end effectors, chassis, connecting rods, and robot bases. For example, in some embodiments, the protective wrap and methods described herein can be used to protect portions of industrial robots used in manufacturing, such as painting robots. In other embodiments, the protective wrap and methods described herein can be used to protect portions of surgical robots, for example, from contaminating substances during a medical procedure, such as blood and irrigating fluid. Other embodiments may relate to other machinery, as explained above.

Thus, in a first aspect, the present disclosure provides a protective wrap for a robot component, the protective wrap comprising a continuous strip of a material sheet configured to wrap around the robot component in a plurality of loops so as to form a tubular body that surrounds a portion of the robot component.

In another aspect the present disclosure provides a protected robot system comprising:
  a robot including at least one joint and a movable robot component coupled to the joint; and
  a protective wrap formed by a material sheet that is wrapped around the robot component in a plurality of loops so as to form a first tubular body that surrounds a portion of the robot component, the plurality of loops including:
    a first loop that encircles the robot component, and
    a second loop that encircles the robot component and overlaps at least a portion of the first loop.

In another aspect, the present disclosure provides a method of protecting a robot so as to form a protected robot system according to the disclosure, the method comprising:
  forming a protective wrap by wrapping a material sheet around a robot component of the robot in a plurality of loops so as to form a first tubular body that surrounds a portion of the robot component, wherein wrapping the material sheet includes forming a first loop that encircles the robot component and forming a second loop that encircles the robot component and overlaps at least a portion of the first loop, and
  wherein the robot component is coupled to a joint of the robot so as to be movable.

In accordance with this disclosure, the wraps described herein encompass materials that in other contexts may be referred to as tapes.

These as well as other aspects, advantages, and alternatives, will become apparent to those of ordinary skill in the art by reading the following detailed description.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
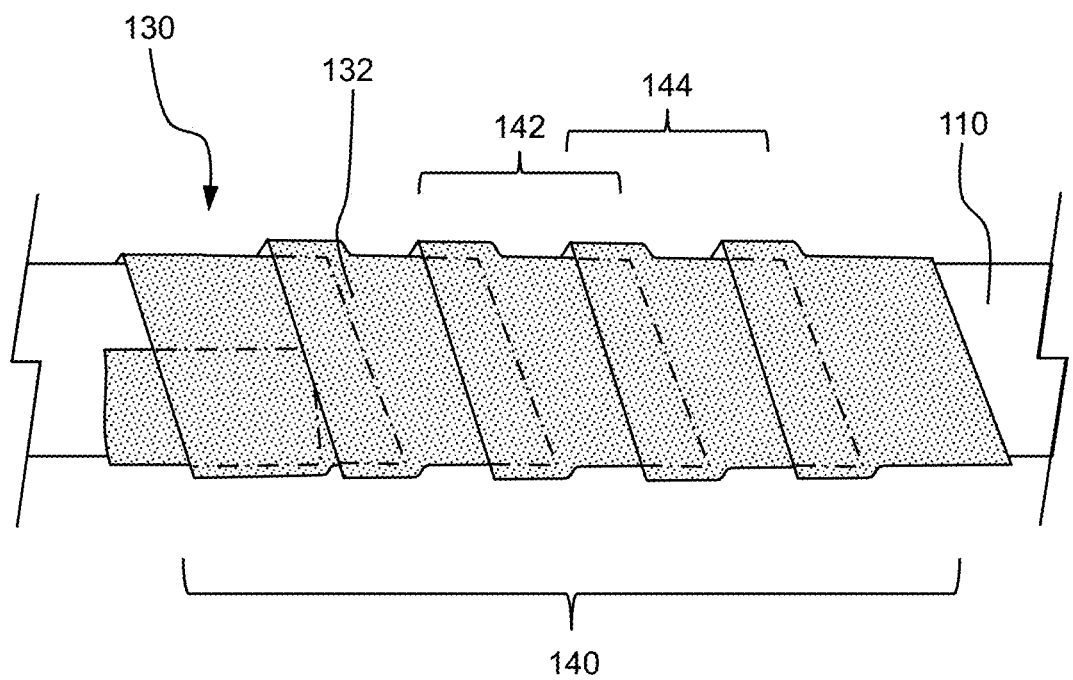
FIG. 1 is a schematic side view of a protected robot component according to an embodiment of the disclosure.

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Unless otherwise indicated, the terms "first" and "second" are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The protective wrap and methods described herein are adapted for protecting portions of a robot system from contaminating substances, such as airborne droplets and dust. For example, painting robots are susceptible to becoming coated with droplets of paint that land on the robot components rather than the target piece. The protective wrap can cover surfaces of the robot so that these paint droplets land on the protective wrap rather than the surface of the robot. Of course, the protective wrap can also protect the surface of the robot from larger contaminants, such as splashes and debris, depending on the use of the robot. Thus, the protective wrap may also be effective for preventing scratches and other undesired surface contact.

In an aspect, the disclosure provides a protected robot system that includes a robot having at least one joint and a movable robot component coupled to the joint. A protective wrap that is formed by a material sheet is wrapped around the robot component in a plurality of loops so as to form a first tubular body that surrounds a portion of the robot component. The loops forming the tubular body include a first loop that encircles the robot component and a second loop that encircles the robot component and overlaps at least a portion of the first loop.

With reference to the Figures, FIG. 1 shows a schematic depiction of a robot component 110 that is partially covered by a protective wrap 130. The protective wrap 130 is formed by a material sheet 132 that is wrapped around the robot component 110 in a plurality of loops so as to form a first tubular body 140 that surrounds a portion of the robot component 110. The first tubular body 140 includes a first loop 142 that encircles the robot component 110 and a second loop 144 that also encircles the robot component 110. A portion of the second loop 144 overlaps a portion of the first loop 142.

In some embodiments, the first loop and the second loop of the protective wrap may be formed by adjacent sections along the length of the material sheet. For example, in some embodiments a portion of the material sheet may wrap around the robot component in an overlapping helix, such that a section of the material sheet that encircles the robot component covers a portion of an immediately adjacent section of the material sheet. Such an embodiment is shown in FIG. 1, where material sheet 132 is wrapped in a helical configuration around robot component 110 such that most of the loops along the tubular body 140 partially cover a neighboring loop on one side and are likewise partially covered by a neighboring loop on the other side.

On the other hand, in other embodiments, the first loop and second loop of the protective wrap may be formed by sections of the material sheet that are spaced apart from one another. For example, in some embodiments, a first section of the material sheet may wrap around the robot component without any overlap as the material sheet extends along the robot component in a first direction while a second section of the material sheet wraps around the robot component in the opposite direction so as to cover the first section. In such a case the first loop may be part of the first section of the material sheet while the second loop may be part of the second section of the material sheet, such that the first and second loops have some overlap but are not immediately adjacent along the length of the material sheet.

Further, it should be understood that the first loop and second loops are not limited to any particular position along the length of the material sheet. Nor are first loop or second loop limited within the tubular body formed by the material sheet. For example, the "first loop" may be a loop of the material sheet that is in the middle of a series of loops that encircle the robot component.

In some embodiments, the material sheet may be formed as a single continuous strip. For example, the material sheet may be formed from one continuous elongated strip of material that wraps around the robot component. Thus, both the first loop and the second loop may be formed by sections of a single strip of the material sheet. In some embodiments, the material sheet may be combined with one or more additional material sheets to protect surfaces of the robot, as described in more detail below.

In some embodiments, the material sheet may be fiberless. For example, the material sheet may be a nonwoven that avoids the possibility of shedding fibers.

Figure 2:
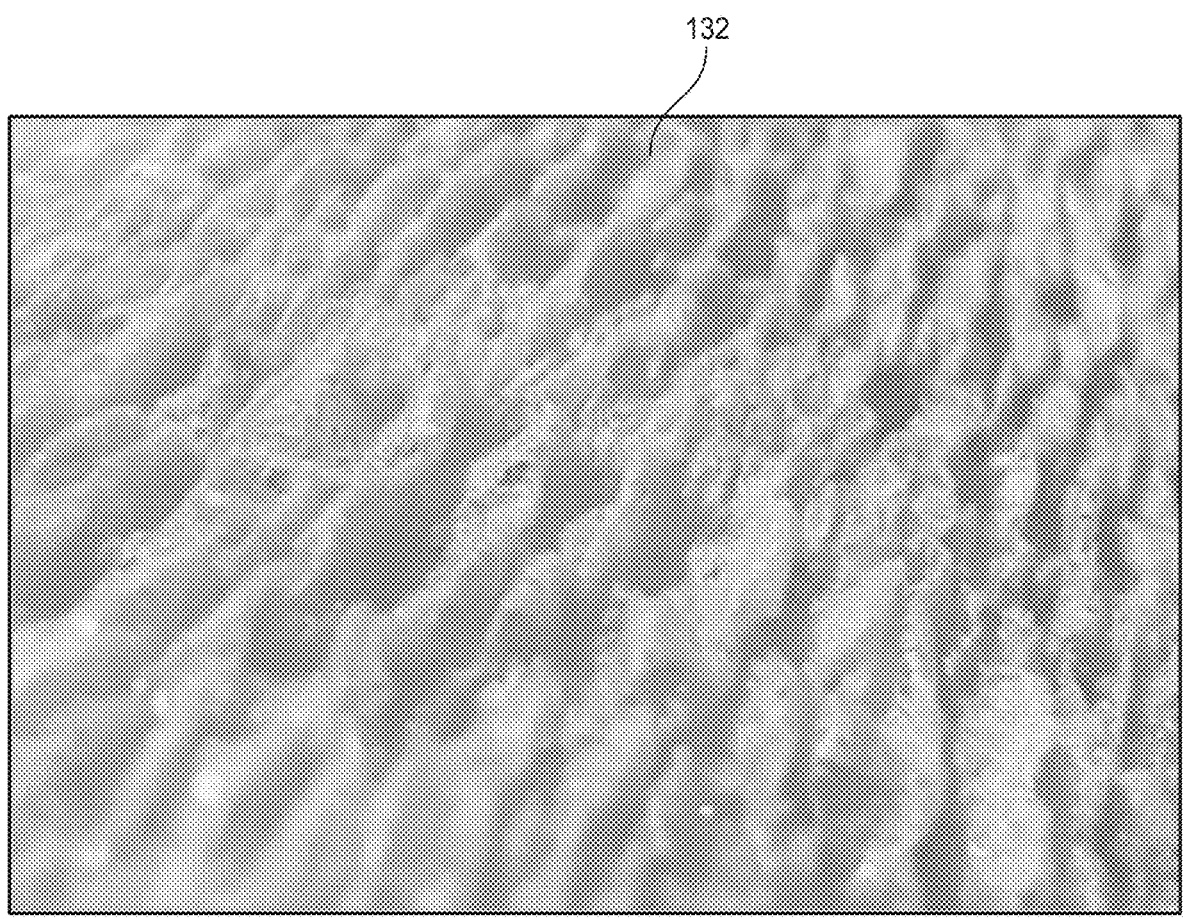
FIG. 2 is an image of a surface of a material sheet according to an embodiment of the disclosure.

In some embodiments, the material sheet may have an undulating topography. For example, FIG. 2 shows a section of a material sheet 132 in accordance with an embodiment of the disclosure. As depicted, the surface of the material sheet in the embodiment of FIG. 2 has a plurality of ridges and valleys. This topography of the material sheet can provide some elasticity to the material sheet, as described further below. Moreover, the undulating topography of the material sheet may aid in capturing contaminants. For example, as droplets of a contaminant, such as paint, come into contact with the material sheet, they may nest within the valleys on the surface of the material sheet. This nest of droplets within the valleys of the material sheet can increase the amount of surface contamination the protective wrap can receive before it should be removed. For example, the nest of droplets within the valleys of the material sheet can reduce dripping of droplets from the protective wrap to other surfaces. In other embodiments, the material sheet may have a smooth or flat surface.

In some embodiments, the material sheet may be porous. For example, in some embodiments, the material sheet may be permeable, such that air can pass through the material sheet. Such a porous material sheet may be advantageous in capturing contaminants in a manner similar to the undulating topography as explained above. In other embodiments, the material sheet may be impermeable. An impermeable material sheet may be beneficial for certain applications because it may reduce contaminants contacting the surface of the robot component.

In some embodiments, the material sheet may be elastic. For example, in some embodiments, the composition of the material sheet is an elastic material that can be stretched before tearing. In other embodiments, the physical shape of the material sheet may impart elasticity to the material sheet. For example, as explained above, in some embodiments, the material sheet can have an undulating topography that provides elasticity to the material sheet. For example, as the material sheet is stretched, the peaks and valleys of the sheet may flatten, thereby allowing the material sheet to elongate without tearing. Still, in other embodiments, a combination of the composition of the material sheet and the topography may provide elasticity to the material sheet. As an example, in some embodiments, the material sheet may stretch from a relaxed state in at least one direction by at least 25% without tearing. Further in some embodiments, the material sheet may stretch at least 50% without tearing. Further still, in some embodiments the material sheet may stretch at least 100% or more without tearing.

In some embodiments, the material sheet may include one or more of nylon, polyester, polypropylene, rayon, spandex, polyamide, cellulosic, acrylic, polyethylene or another suitable composition. Further, in some embodiments, the material sheet may be free of silicone.

The material sheet may have a range of different widths. For example, in some embodiments, the material sheet may be at least 8 inches wide, e.g., at least 10 inches wide, e.g., at least 12 inches wide, e.g., at least 15 inches wide. In other embodiments, the material sheet may be less than 8 inches wide, such as 1 inch wide, 2 inches wide, 4 inches wide, or 6 inches wide. Further, in some embodiments, the material sheet may have varying widths. For example, in some embodiments, the material sheet may have a first width that runs along a majority of the length of the material sheet with sections along the length of the material sheet that have a shorter width. Such narrow sections may be used to arrange the material sheet around certain geometries of the robot component. For example, a narrow section may be beneficial around a bending section of a robot component.

In some embodiments, the material sheet may be self-adhering. For example, the material sheet may be a cohesive sheet such that the material sheet will adhere to itself but not to other surfaces, such as the surface of the robot component. To achieve the self-adhering aspect of the material sheet, the material sheet may include a cohesive substance on a surface of the material sheet. For example, in some embodiments, a cohesive substance that substantially adheres to itself is provided on both the first side of the material sheet and the second side of the material sheet. In some embodiments, the cohesive substance may include at least one of a latex-based cohesive or a latex-free cohesive, e.g., at least one of natural rubber latex, synthetic rubber latex, polyisoprene, polychloroprene, polyester polyurethane, and polycaprolactone polyurethane.

In other embodiments, a first adhesive substance is provided on a first side of the material sheet and a second adhesive substance is provided on a second side of the material sheet. In some embodiments, the first and second adhesive substances may be formulated to substantially adhere to one another but not to other surfaces, so as to form a self-adhering material sheet. In other embodiments, the first and second adhesive substances may be non-adherent individually but combine to form an adhesive, such that each side of the material sheet is non-adhering, but the two sides of the material sheet form an adhesive when joined. Further, in some embodiments, the physical structure of the material sheet may be configured to be self-adhering. For example, the material sheet may include a surface texture that forms a mechanical attachment when portions of the material sheet are positioned against one another, in a manner similar to hook-and-loop material or another recloseable fastener. Accordingly, a robot component can be covered with protective wrap including a self-adhering material sheet without fasteners.

In some embodiments, the material sheet may be flame retardant. For example, in some embodiments, the material sheet may be treated to be flame retardant or may include a flame retardant substance. In other embodiments, the material sheet may be flame resistant.

In some embodiments, the tubular body may substantially conform to an outer shape of the robot component. For example, in some embodiments, the material sheet is wrapped tightly around the robot component, such that the shape of the tubular body substantially conforms to the outer shape of the portion of the robot component that is covered by the tubular body. For example, in some embodiments, the entire interior surface of the tubular body is no more than 2 inches from the exterior surface of the robot component. In other words, in such an embodiment, no point on the interior surface of the tubular body is more than 2 inches from the nearest point on the exterior surface of the robot component. Further, in some embodiment the entire interior surface of the tubular body is no more than 1 inch from the exterior surface of the robot component. Further still, in some embodiments, the entire interior surface of the tubular body is no more than ½ inch from the exterior surface of the robot component. By substantially conforming the material sheet to the outer shape of the robot component, the amount or weight of the protective wrap can be reduced. This may provide advantages over other types of protective elements that cover the robot more loosely.

Further, in some embodiments, the protective wrap can conform to the outer surface of the robot component over a change in size of the robot component. For example, in some embodiments, the tubular body formed by the material sheet may extend from a section of a robot component with a thicker diameter to a section of the robot component with a smaller diameter. For example, the tubular body may extend over sections of a robot component that vary in diameter by as much as a factor of 1.5×, 2×, 3× or more. By conforming to the outer shape of the robot component, the protective wrap can avoid interfering with external structures around the robot or getting caught on such external structures. Accordingly, a robot component covered with the protective wrap can operate in small spaces without interference. This may provide advantages over other types of protective elements that cover the robot more loosely. In some embodiments, the protective wrap can help avoid damaging a painted surface.

Figure 3A:
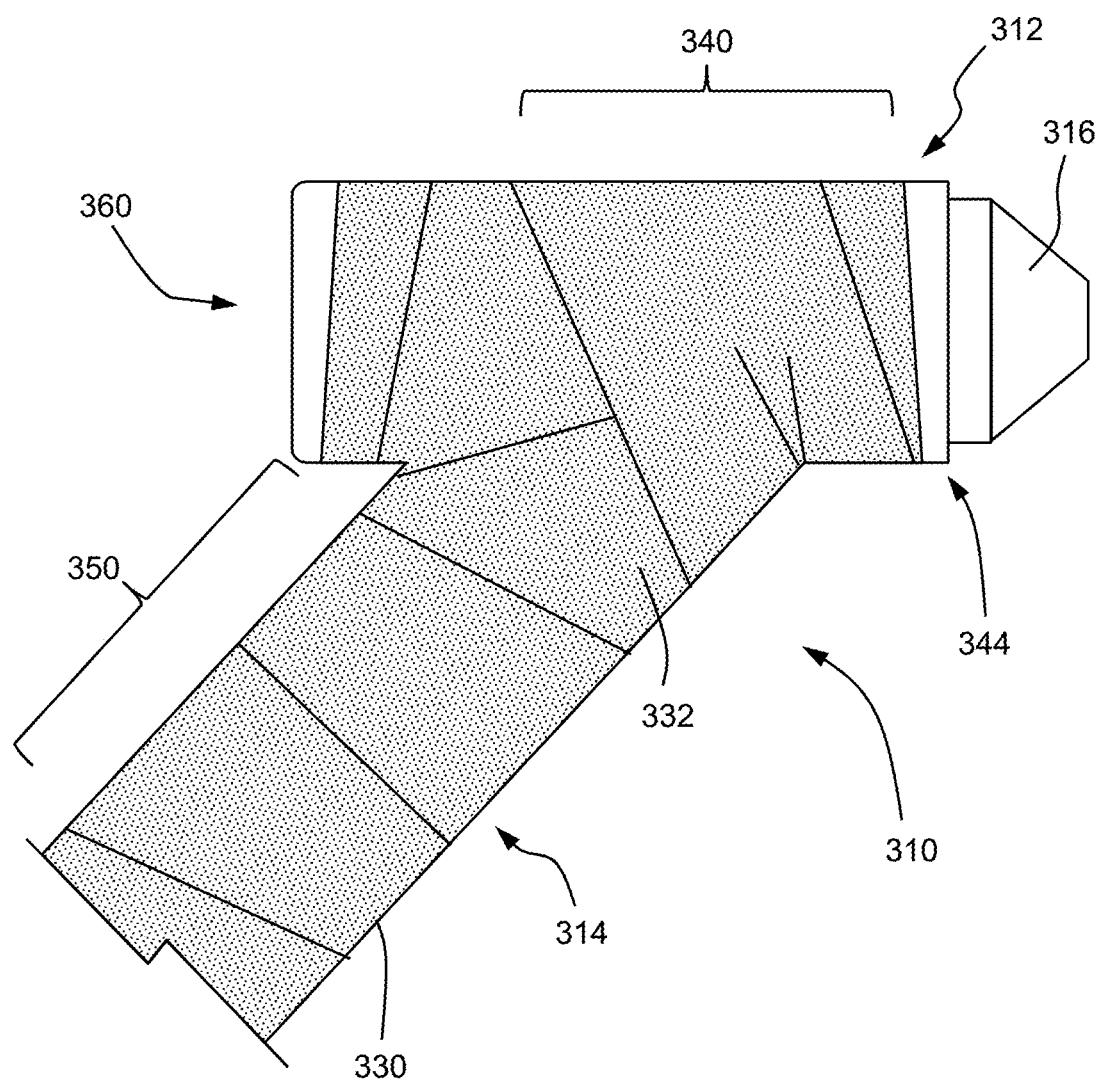
FIG. 3A is a schematic side view of a protected robot component according to another embodiment of the disclosure.
Figure 3B:
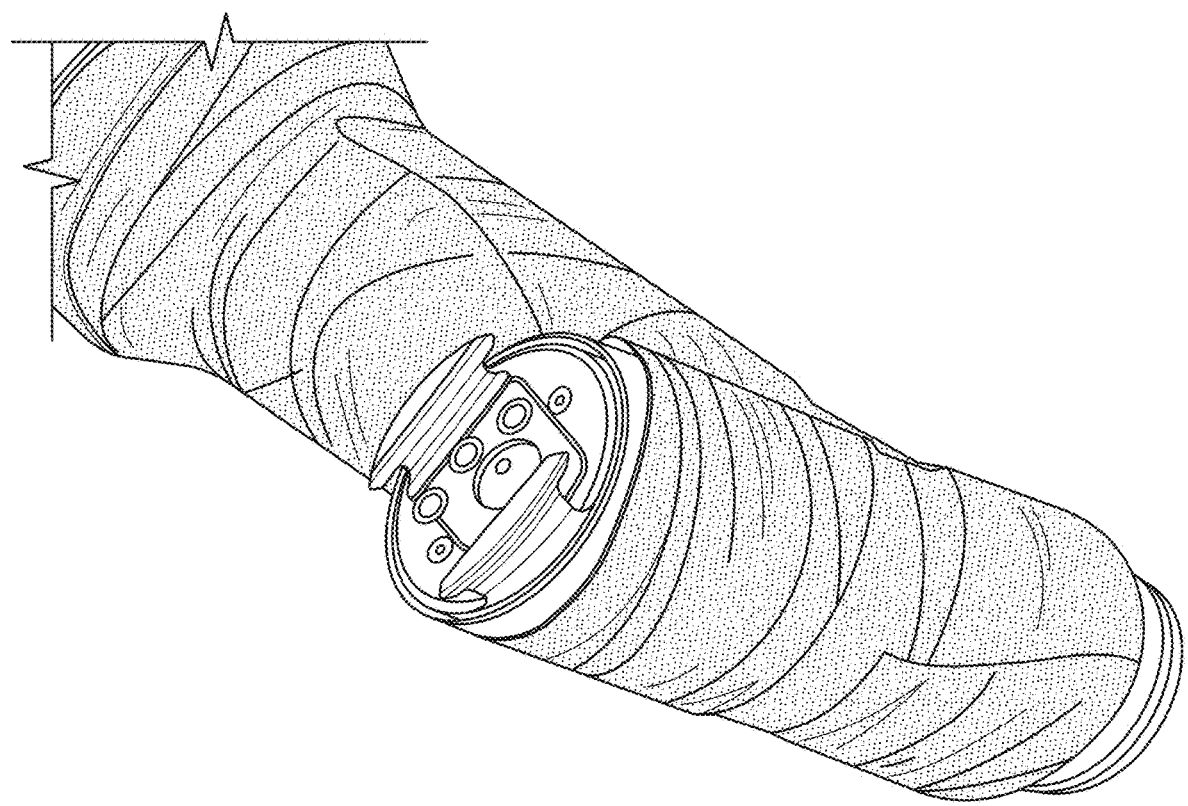
FIG. 3B is an image of the protected robot component of FIG. 3A from another angle.
Figure 3C:
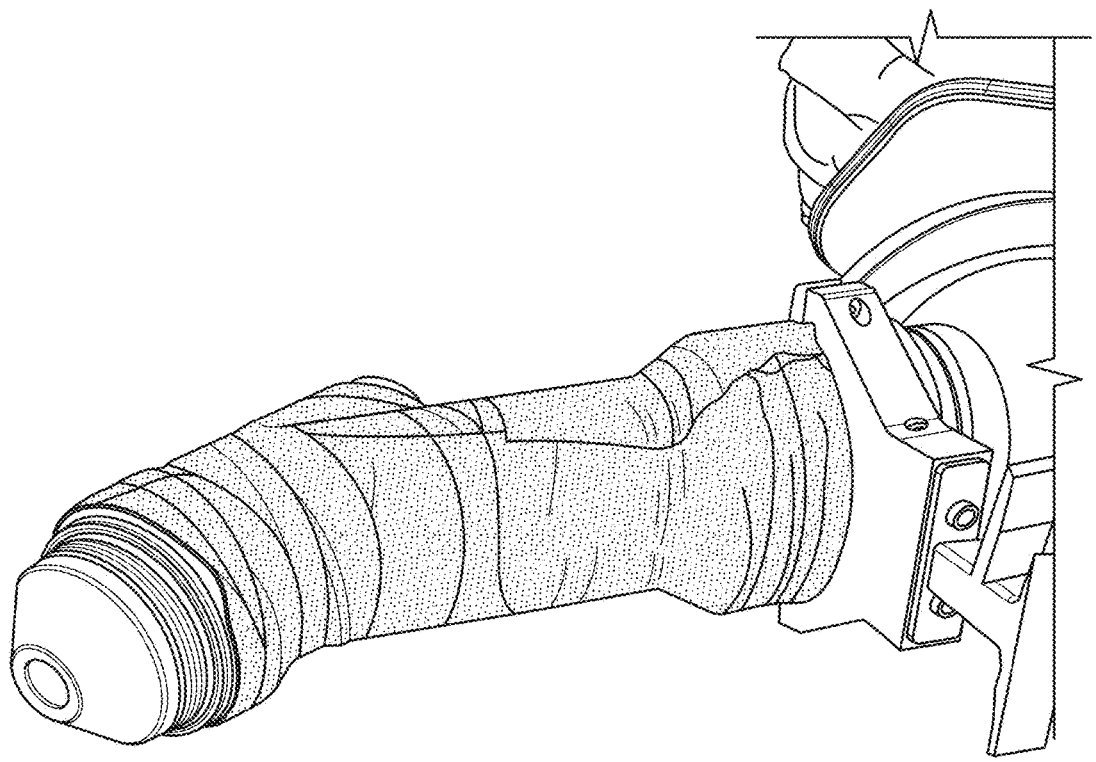
FIG. 3C is an image of the protected robot component of FIG. 3A from another angle.

In some embodiments, the material sheet may also be wrapped around the robot component so as to form a second tubular body that surrounds the robot component and an opening is provided in the protective wrap between the first tubular body and the second tubular body. Such an embodiment is shown in FIG. 3A-3C. The robot component 310 includes a first section 312 and a second section 314 that is disposed at an angle to the first section 312. As shown, the first section 312 forms a distal end of the robot component and the second section 314 is connected to other parts of the robot, for example through a joint. A protective wrap 330 may cover parts of the robot component 310. In particular, a material sheet 332 may be wrapped around the first section 312 in a manner that forms a first tubular body 340 and around the second section 314 in a manner that forms a second tubular body 350. An opening 360 in the protective wrap 330 may be provided between the first tubular body 340 and the second tubular body 350.

In some embodiments, the opening may provide access to a surface of the robot component. For example, the opening in the protective wrap may provide access for connecting additional components to the robot component. For example, the opening may provide access to electrical ports for sending or receiving data, such as operating instructions or sensor data, to/from the robot component. Likewise, the opening may provide access for fluid ports, such as for delivery from the robot component or for pneumatic or hydraulic systems. Further still, in some embodiments, the opening may provide access to information, such as information provided on a label or screen. Other uses of the opening are also possible. Moreover, in some embodiments the opening in the protective wrap may be provided for convenience, such as to avoid covering a portion of the robot that is difficult or unnecessary to cover.

Figure 4:
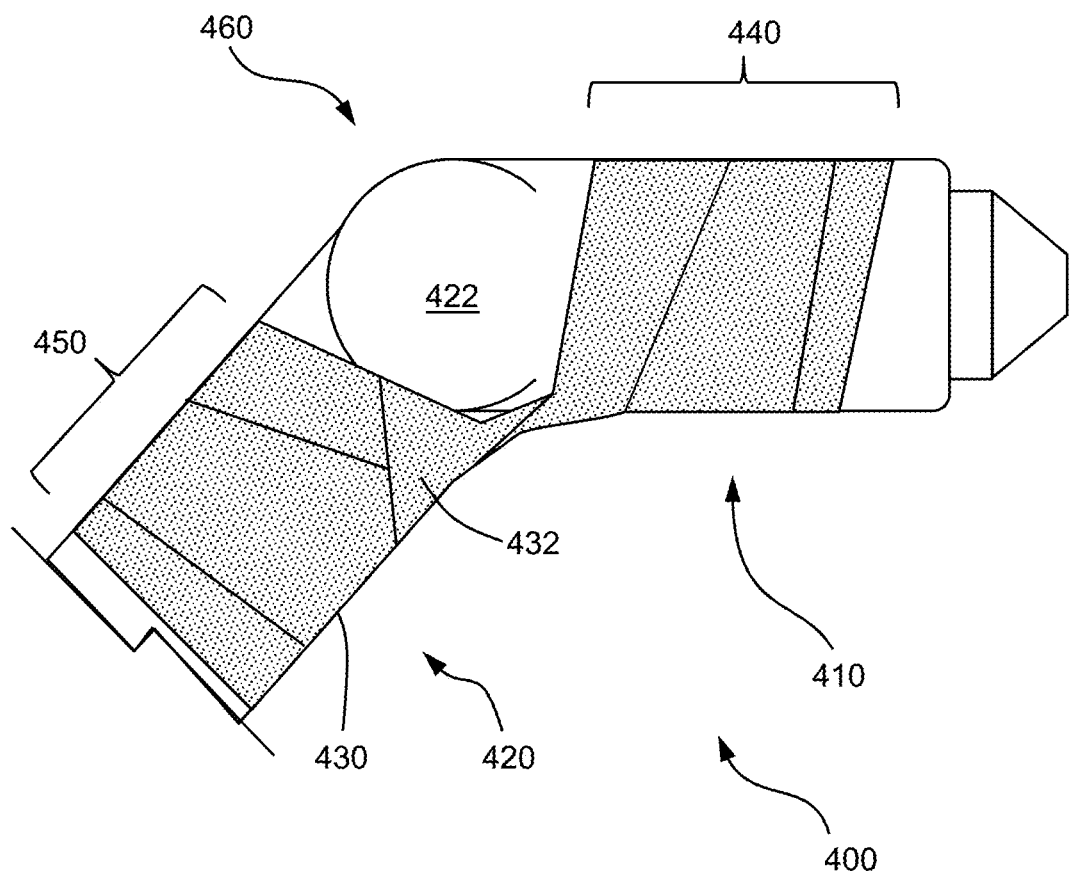
FIG. 4 is a schematic side view of two protected robot components according to an embodiment of the disclosure.

In some embodiments, the material sheet may also be wrapped around a second robot component so as to form a second tubular body that surrounds the second robot component and an opening is provided in the protective wrap between the first tubular body and the second tubular body. Such an embodiment is shown in FIG. 4. The robot system 400 shown in FIG. 4 includes a first robot component 410 and a second robot component 420 that are connected to one another. A protective wrap 430 may cover parts of the robot. In particular, a material sheet 432 may be wrapped around the first robot component 410 in a manner that forms a first tubular body 440 and around the second robot component 420 in a manner that forms a second tubular body 450. An opening 460 in the protective wrap 430 may be provided between the first tubular body 440 and the second tubular body 450.

In some embodiments, a robot joint between the first robot component and the second robot component may be provided in the opening between the first tubular body and the second tubular body. For example, in the embodiment shown in FIG. 4, first robot component 410 and second robot component 420 are connected by a joint 422. An opening 460 in the protective wrap 430 may be provided in the area surrounding the joint 422. Such an opening can help the protective wrap 430 from interfering with the joint 422. In other embodiments, the protective wrap may continue over the joint without any opening. Still, in other embodiments, joints may be avoided entirely by the protective wrap, such that the robot system does not include any material sheets forming a protective wrap that extend from side of a joint to the opposing side of a joint. Further, in some embodiments, the protective wrap may be provided on either side of a joint, while a different type of cover extends over the joint.

In some embodiments, the protected robot system includes additional elements that protect the surface of the robot. For example, in some embodiments, the protected robot system may also include a protective cover in the form of an envelope that covers a portion of the robot. In other embodiments, the protected robot system may also include one or more additional protective wraps that covers another portion of the robot. Further still, in some embodiments, the protected robot system may include covers in the form of sheets that are draped over portions of the robot. Moreover, some embodiments may include any combination of one or more protective wraps, covers formed as envelopes, and covers formed as sheets.

The term envelope, as used herein, refers to a cover that forms a predefined cavity. For example, the envelope may be in the form of a tube with an interior space configured to enclose a portion of the robot. Likewise, such an envelope may be in the form of a pocket or back with a closed end that slips over a portion of the robot. The envelope may include a closeable opening along an edge that uses fasteners to close and form a tube or pocket. The term envelope, as used herein, is distinct from a wrap, in that it does not form an enclosure or tube by looping around the robot a plurality of times.

Figure 5:
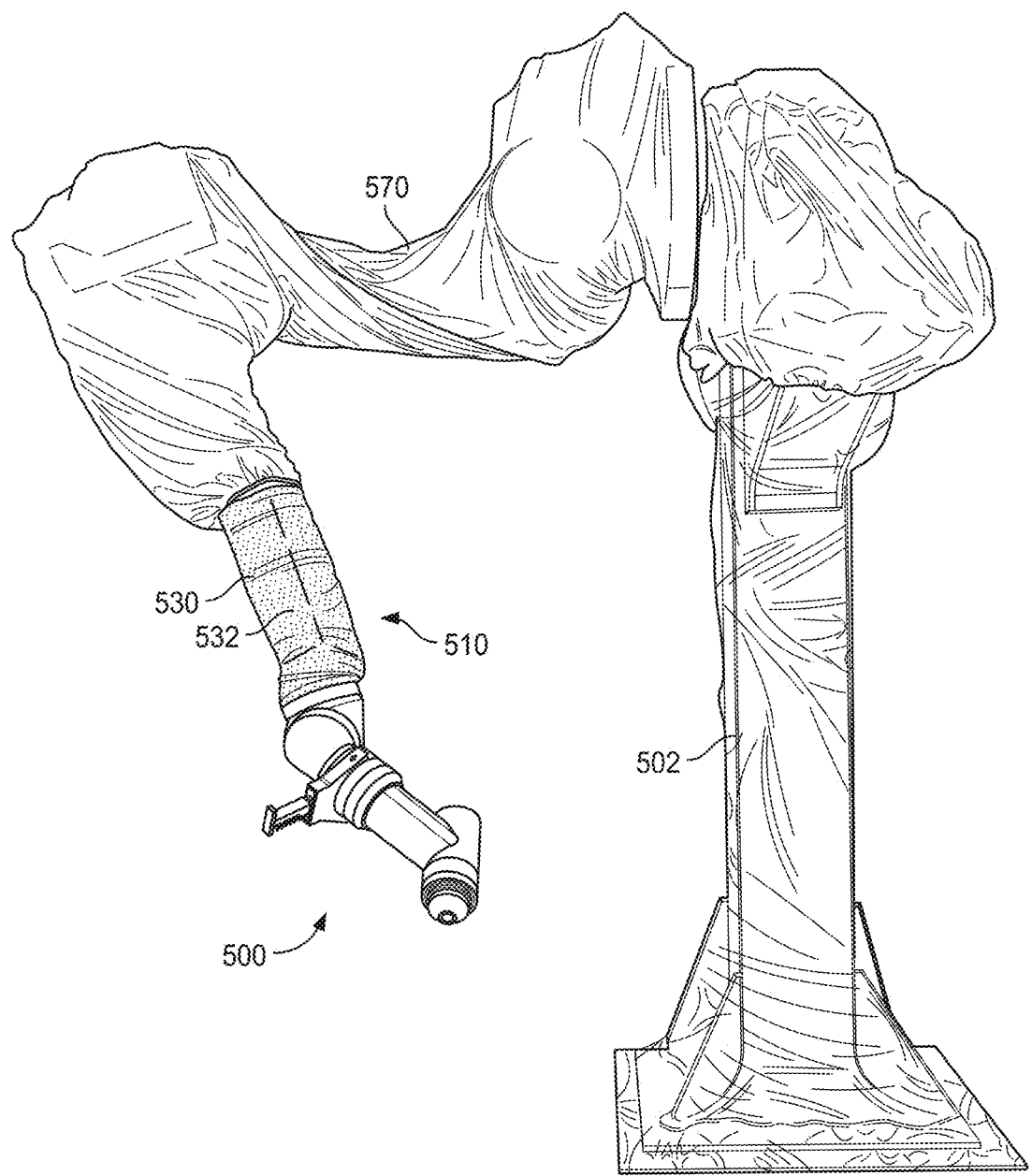
FIG. 5 is an image of a protected robot system according to an embodiment of the disclosure.
Figure 6:
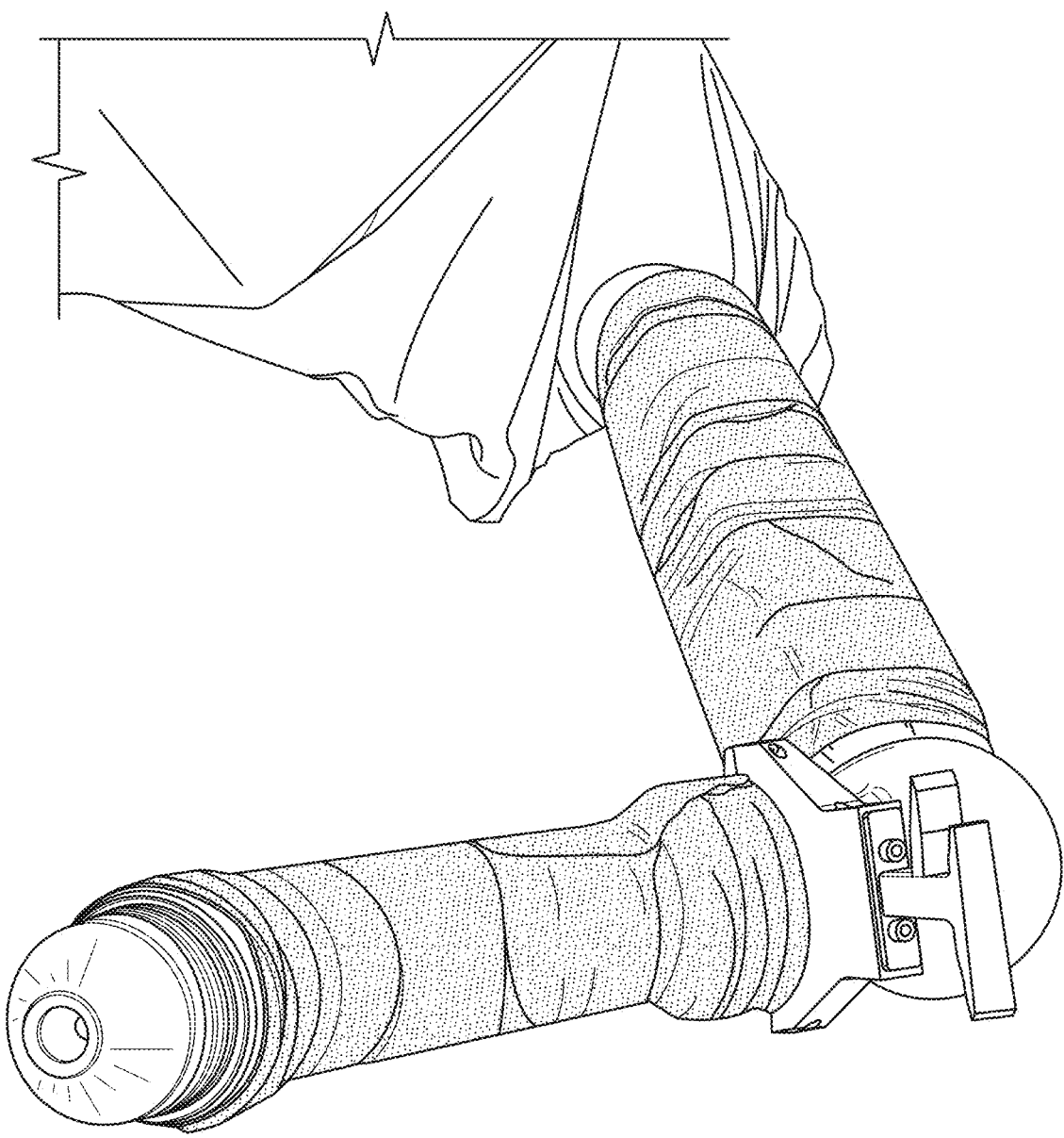
FIG. 6 is an image of the protected robot system of FIG. 5 from another angle with the end effector covered.
Figure 7:
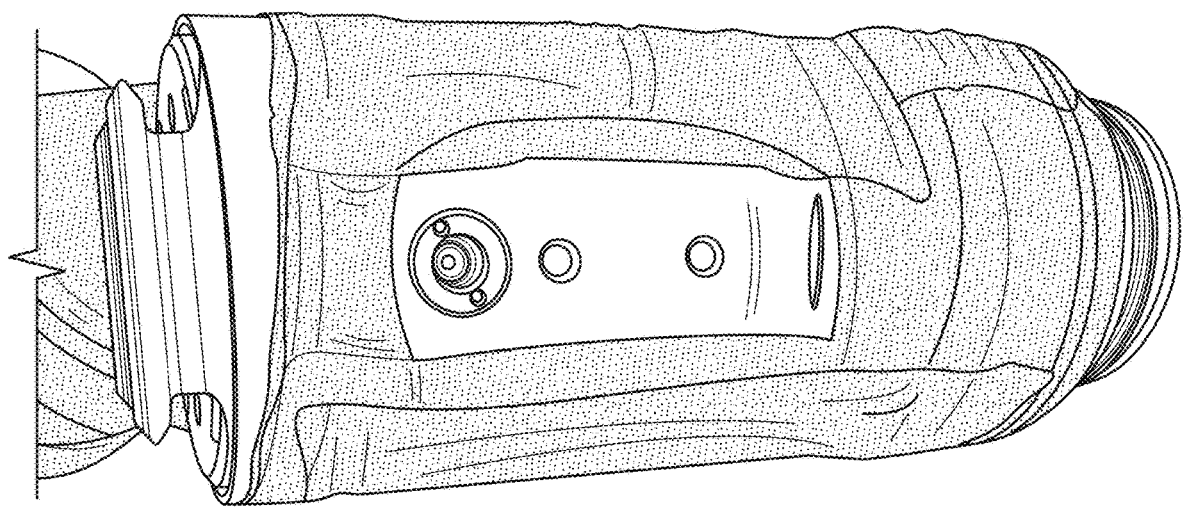
FIG. 7 is an image of another protected robot component.

An embodiment of a robot system including such a protective cover is shown in FIG. 5. Robot system 500 includes a robot 502. A portion of the robot 502 is enclosed by a cover 570 in the form of an envelope cover shaped as a tube. The robot 502 also includes a robot component 510 in the form of a robot arm that is covered with a protective wrap 530 formed by a material sheet 532 that wraps around the robot arm 510 in the manner described above. Thus, in robot system 500, part of the robot 502 is protected by the cover 570 and part of the robot 502 is covered by the protective wrap 530.

In some embodiments, a portion of the tubular body may overlap an open end of the protective cover. For example, in some embodiments, the protective cover may be placed on the robot first, and the protective wrap may be wrapped around a portion of the robot so as to form a tubular body that extends over part of the protective cover. Such a configuration may allow the protective wrap to enclose an open end of the protective cover and ensure continuous protection across the interface between the protective wrap and the protective cover.

On the other hand, in some embodiments, an open end of the protective cover may overlap a portion of the tubular body. For example, in some embodiments, the entire protective wrap may be applied to the surface of the robot and the protective cover may be slid over a portion of the protective wrap. Such a configuration may allow the protective wrap to form a tight fit over a desired section of the robot.

In some embodiments, the protected robot system may include more than one material sheet that are used together to cover a certain portion of the robot. For example, in some embodiments, the first tubular body incorporates a second material sheet that overlaps at least a portion of the material sheet. In other words, in some embodiments, two materials sheets may be used in combination to form a continuing or reinforced tubular body. The first material sheet may wrap around the robot component a plurality of times to form part of the first tubular body and the second material sheet may overlap a portion of the first material sheet. Thus, the second material sheet may further lengthen the first tubular body or may increase the number of layers of the first tubular body.

In some embodiments, the first tubular body may include an open end and a distal portion of the robot component may extend from the open end. For example, as shown in FIGS. 3A-3C, the robot component 310 includes a distal end 316 that extends out from an open end 344 of the first tubular body 340.

In some embodiments, the distal portion of the robot component may include a nozzle for a fluid. For example, in some embodiments, the distal portion of the robot component may be a painting tool. For example, in some embodiments, the robot component may be a paint bell or a paint gun. Further in some embodiments, the robot component may be a cartridge bell. Alternatively, in some embodiments, the nozzle may be for another fluid. For example, in some embodiments, the robot component may be a cleaning tool, and the nozzle may be configured to spray water or air. Other configurations and uses of nozzles are also possible.

In some embodiments, the distal portion of the robot component may include another end effector. For example, in some embodiments, the robot component may be a mechanical tool, a gripping component, such as jaws, a laser, a welding tool, a surgical tool, or another end effector. On the other hand, in some embodiments, the robot component may be another component of the robot, such as a wrist or an arm segment.

In another aspect, the disclosure provides a method of protecting a robot so as to form a protected robot system according to the disclosure. The method may include forming a protective wrap by wrapping a material sheet around a robot component of the robot in a plurality of loops so as to form a first tubular body that surrounds a portion of the robot component. Wrapping the material sheet may include forming a first loop that encircles the robot component and forming a second loop that encircles the robot component and overlaps at least a portion of the first loop. The robot component may be a coupled to a joint of the robot so as to be movable.

Figure 8:
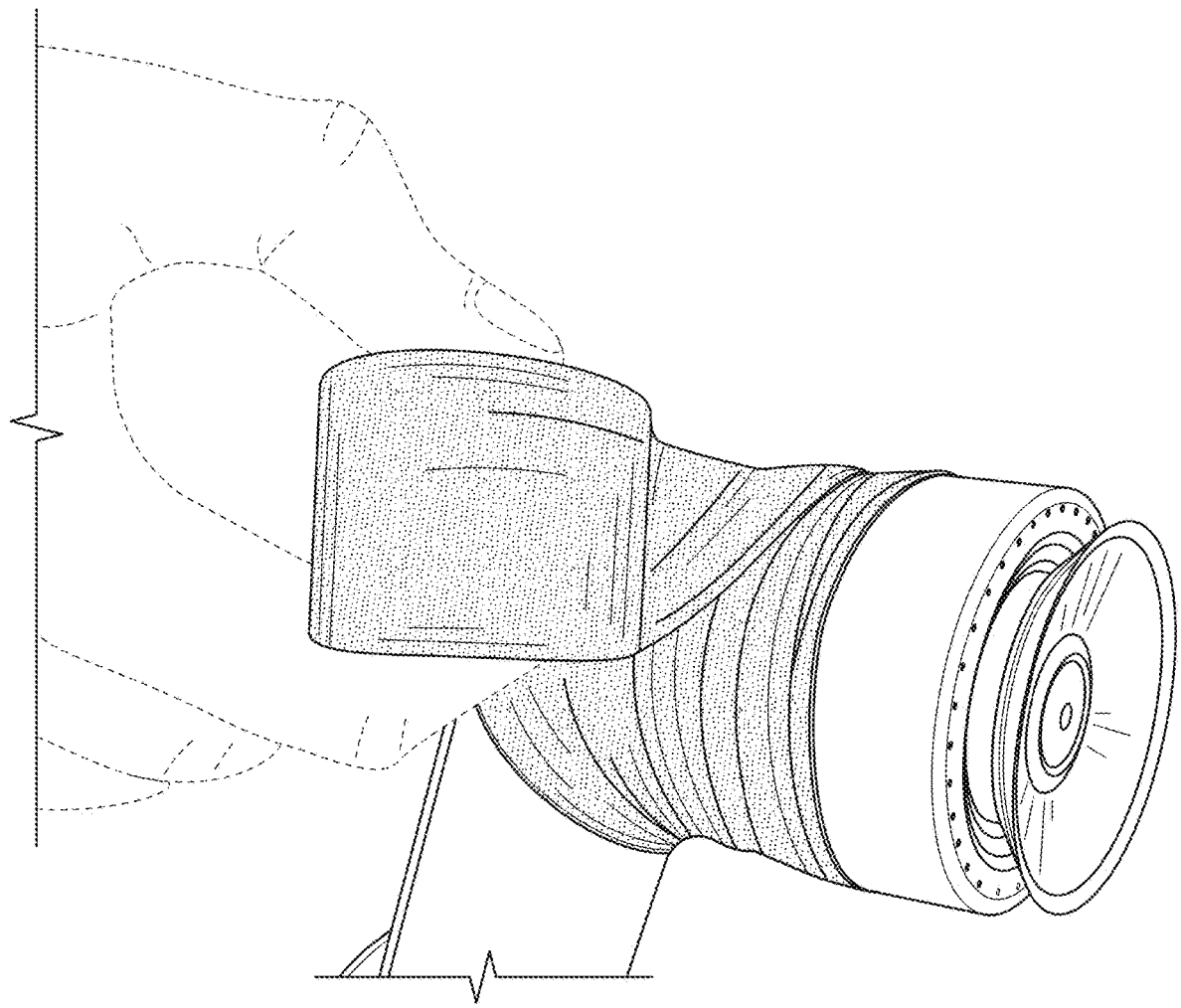
FIG. 8 shows an image of a person applying a protective wrap to a robot component in accordance with an embodiment of the disclosure.

A depiction of an operation in an embodiment of the method of protecting a robot is shown in FIG. 8, where a person is wrapping a material sheet around a robot component so as to form a protective wrap around the robot component. In some embodiments, the material sheet can be tearable by hand of the person.

In some embodiments, the method may also include removing the protective wrap after a certain amount of use. For example, in some embodiments, the protective wrap may be removed after a certain amount of time or cycles of use, after the protective wrap accumulates a certain amount of contaminants, or when the protective wrap appears contaminated.

Further, in some embodiments, the method may include forming a second protective wrap over at least a portion of the initial protective wrap after the initial protective wrap has been used. For example, in some embodiments, after the protective wrap accumulates a certain amount of contaminants, such as paint, an operator may wrap the contaminated protective wrap with a second protective wrap to prevent dripping or further contamination from the initial protective wrap. The formation of the second protective wrap can be substantially more efficient than an entire removal and re-wrapping of the component, while addressing the existing contamination.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

EMBODIMENTS

Embodiment 1. A protective wrap for a robot component, the protective wrap comprising a continuous strip of a material sheet configured to wrap around the robot component in a plurality of loops so as to form a tubular body that surrounds a portion of the robot component.

Embodiment 2. The protective wrap according to embodiment 1, wherein the material sheet is formed as a single continuous strip.

Embodiment 3. The protective wrap according to embodiment 1, wherein the material sheet is fiberless.

Embodiment 4. The protective wrap according to embodiment 1, wherein the material sheet has an undulating topography.

Embodiment 5. The protective wrap according to embodiment 1, wherein the material sheet is porous.

Embodiment 6. The protective wrap according to embodiment 1, wherein the material sheet is elastic.

Embodiment 7. The protective wrap according to embodiment 1, wherein the material sheet is free of silicone.

Embodiment 8. The protective wrap according to embodiment 1, wherein the material sheet is at least 8 inches wide, e.g., at least 10 inches wide, e.g., at least 12 inches wide, e.g., at least 15 inches wide.

Embodiment 9. The protective wrap according to embodiment 1, wherein the material sheet is self-adhering.

Embodiment 10. The protective wrap according to embodiment 1, wherein a cohesive substance is provided on a surface of the material sheet.

Embodiment 11. The protective wrap according to embodiment 1, wherein the material sheet is flame retardant.

Embodiment 12. A protected robot system comprising:
a robot including at least one joint and a movable robot component coupled to the joint; and
a protective wrap formed by a material sheet that is wrapped around the robot component in a plurality of loops so as to form a first tubular body that surrounds a portion of the robot component, the plurality of loops including:
a first loop that encircles the robot component, and
a second loop that encircles the robot component and overlaps at least a portion of the first loop.

Embodiment 13. The protected robot system according to embodiment 12, wherein the material sheet is formed as a single continuous strip.

Embodiment 14. The protected robot system according to embodiment 12, wherein the material sheet is fiberless.

Embodiment 15. The protected robot system according to embodiment 12, wherein the material sheet has an undulating topography.

Embodiment 16. The protected robot system according to embodiment 12, wherein the material sheet is porous.

Embodiment 17. The protected robot system according to embodiment 12, wherein the material sheet is elastic.

Embodiment 18. The protected robot system according to embodiment 12, wherein the material sheet is free of silicone.

Embodiment 19. The protected robot system according to embodiment 12, wherein the material sheet is at least 8 inches wide, e.g., at least 10 inches wide, e.g., at least 12 inches wide, e.g., at least 15 inches wide.

Embodiment 20. The protected robot system according to embodiment 12, wherein the material sheet is self-adhering.

Embodiment 21. The protected robot system according to embodiment 12, wherein a cohesive substance is provided on a surface of the material sheet.

Embodiment 22. The protective robot system according to embodiment 12, wherein the material sheet is flame retardant.

Embodiment 23. The protected robot system according to embodiment 12, wherein the tubular body substantially conforms to an outer shape of the robot component.

Embodiment 24. The protected robot system according to embodiment 12, wherein the material sheet is also wrapped around the robot component so as to form a second tubular body that surrounds the robot component, and wherein an opening is provided in the protective wrap between the first tubular body and the second tubular body.

Embodiment 25. The protected robot system according to embodiment 24, wherein the opening provides access to a surface of the robot component.

Embodiment 26. The protected robot system according to embodiment 12, wherein the material sheet is also wrapped around a second robot component so as to form a second tubular body that surrounds the second robot component, and wherein an opening is provided in the protective wrap between the first tubular body and the second tubular body.

Embodiment 27. The protected robot system according to embodiment 26, wherein a robot joint between the first robot component and the second robot component is provided in the opening between the first tubular body and the second tubular body.

Embodiment 28. The protected robot system according to embodiment 12, further comprising a protective cover in the form of an envelope that covers a portion of the robot.

Embodiment 29. The protected robot system according to embodiment 28, wherein a portion of the tubular body overlaps an open end of the protective cover.

Embodiment 30. The protected robot system according to embodiment 28, wherein an open end of the protective cover overlaps a portion of the first tubular body.

Embodiment 31. The protected robot system according to embodiment 12, wherein the first tubular body incorporates a second material sheet that overlaps at least a portion of the material sheet.

Embodiment 32. The protected robot system according to embodiment 12, further comprising a second protective wrap formed by a second material sheet that is wrapped around a second robot component in a plurality of loops so as to form a second tubular body that surrounds a portion of the second robot component.

Embodiment 33. The protected robot system according to embodiment 12, wherein the first tubular body includes an open end and a distal portion of the robot component extends from the open end.

Embodiment 34. The protected robot system according to embodiment 33, wherein the distal portion of the robot component includes a nozzle for a fluid.

Embodiment 35. The protected robot system according to embodiment 33, wherein the distal portion of the robot component includes an end effector.

Embodiment 36. The protected robot system according to embodiment 33, wherein the robot component is a paint bell.

Embodiment 37. The protected robot system according to embodiment 36, wherein the paint bell is a cartridge bell.

Embodiment 38. The protected robot system according to embodiment 33, wherein the robot component is a paint gun.

Embodiment 39. The protected robot system according to embodiment 12, wherein the robot component is an arm segment.

Embodiment 40. A method of protecting a robot so as to form a protected robot system according to any of embodiments 12 to 39, the method comprising:
forming a protective wrap by wrapping a material sheet around a robot component of the robot in a plurality of loops so as to form a first tubular body that surrounds a portion of the robot component, wherein wrapping the material sheet includes forming a first loop that encircles the robot component and forming a second loop that encircles the robot component and overlaps at least a portion of the first loop, and
wherein the robot component is a coupled to a joint of the robot so as to be movable.

The invention claimed is:

1. A protected robot system comprising:
a robot including at least one joint and a movable robot component coupled to the joint; and
a protective wrap formed by a cohesive material sheet that is wrapped around the robot component in a plurality of loops so as to form a first tubular body that surrounds a portion of the robot component, the plurality of loops including:
a first loop that encircles the robot component, and
a second loop that encircles the robot component and overlaps at least a portion of the first loop such that a portion of the second loop is adhered to the portion of the first loop.

2. The protected robot system according to claim 1, wherein the material sheet is formed as a single continuous strip.

3. The protected robot system according to claim 1, wherein the material sheet has an undulating topography.

4. The protected robot system according to claim 1, wherein the material sheet is elastic.

5. The protected robot system according to claim 1, wherein the tubular body substantially conforms to an outer shape of the robot component.

6. The protected robot system according to claim 1, further comprising a protective cover in the form of an envelope that covers a portion of the robot adjacent to the robot component.

7. The protected robot system according to claim 6, wherein a portion of the first tubular body surrounds an open end of the protective cover.

8. The protected robot system according to claim 6, wherein an open end of the protective cover surrounds a portion of the tubular body.

9. The protected robot system according to claim 1, wherein the tubular body incorporates a second material sheet that overlaps at least a portion of the material sheet.

10. The protected robot system according to claim 1, wherein the first tubular body includes an open end and a distal portion of the robot component extends from the open end.

11. The protected robot system according to claim 10, wherein the distal portion of the robot component includes a nozzle for a fluid or an end effector.

12. The protected robot system according to claim 1, wherein the material sheet is not adhered to the robot component.

13. A method of protecting a robot so as to form a protected robot system, the method comprising:
forming a protective wrap by wrapping a self-adhering material sheet around a robot component of the robot in a plurality of loops so as to form a first tubular body that surrounds a portion of the robot component without adhering the material sheet to the robot component, wherein wrapping the material sheet includes forming a first loop that encircles the robot component and forming a second loop that encircles the robot component and overlaps at least a portion of the first loop such that a portion of the second loop is adhered to the portion of the first loop, and
wherein the robot component is a coupled to a joint of the robot so as to be movable.

14. The method according to claim 13, further comprising forming a second protective wrap over at least a portion of the protective wrap by wrapping a second material sheet around the robot component in a plurality of loops.

15. The method according to claim 13, further comprising removing the protective wrap after the protective wrap accumulates contaminants.

16. A protected robot system comprising:
a robot including at least one joint and a movable robot component coupled to the joint; and
a protective wrap formed by a material sheet that is wrapped around the robot component in a plurality of loops so as to form a first tubular body that surrounds a portion of the robot component without adhering to the robot component, wherein a first side of the material sheet includes a first adhesive and a second side of the material sheet includes a second adhesive, and wherein the plurality of loops includes:
a first loop that encircles the robot component, and
a second loop that encircles the robot component and overlaps at least a portion of the first loop such that a portion of the second loop is adhered to the portion of the first loop.

17. The protected robot system according to claim 16, wherein the material sheet is formed as a single continuous strip.

18. The protected robot system according to claim 16, wherein the material sheet has an undulating topography.

19. The protected robot system according to claim 16, wherein the material sheet is elastic.

20. The protected robot system according to claim 16, wherein the tubular body substantially conforms to an outer shape of the robot component.

* * * * *